Dec. 5, 1933.          W. H. HOFFMAN          1,938,334
                       VARIABLE CONDENSER
              Filed July 1, 1929        2 Sheets-Sheet 1
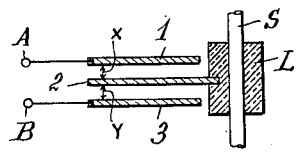
Fig. 1,
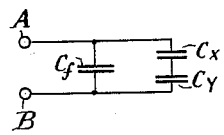
Fig. 2,
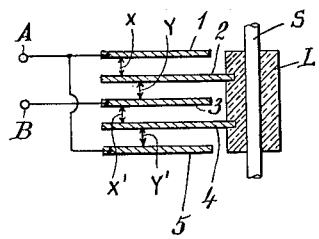
Fig. 3,
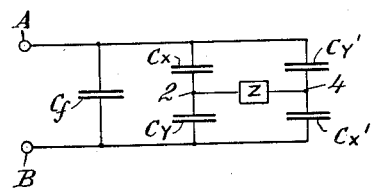
Fig. 4,
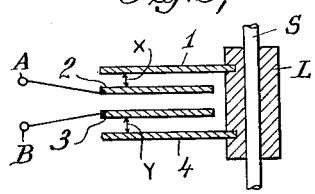
Fig. 5,
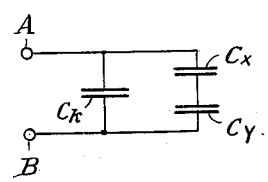
Fig. 6,
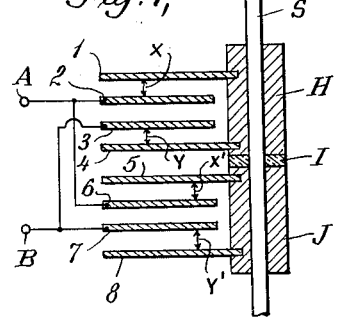
Fig. 7,
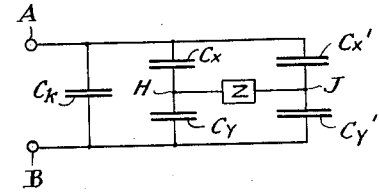
Fig. 8,
INVENTOR
W. H. HOFFMAN
BY
Pennie, Davis, Marvin & Edmonds.
ATTORNEYS Dec. 5, 1933.   W. H. HOFFMAN   1,938,334
VARIABLE CONDENSER
Filed July 1, 1929   2 Sheets-Sheet 2

INVENTOR
W. H. HOFFMAN
BY
Pennie, Davis, Marvin & Edmonds.
ATTORNEYS

Patented Dec. 5, 1933

1,938,334

UNITED STATES PATENT OFFICE 1,938,334

VARIABLE CONDENSER

William H. Hoffman, Madison, Wis., assignor to Burgess Battery Company, Madison, Wis., a corporation of Wisconsin Application July 1, 1929. Serial No. 375,061

13 Claims. (Cl. 175—41.5)

This invention relates to electrical condensers and more especially to condensers of the rotary interleaving plate type which are continuously variable between certain capacity limits.

An object of the invention is to provide a condenser of the above type wherein complementary dielectric gaps occurring between rotor and stator elements (i. e., gaps the sum of which is constant irrespective of axial shiftings of the rotor relative to the stator element) are serially connected between the condenser terminals.

A further object of the invention is to provide a condenser of the type mentioned wherein by reason of the aforementioned series connection of the complementary dielectric gaps, the capacity of the condenser for a given angular setting of the rotor element is unaffected by axial movements of the rotor relative to the stator element.

A further object of the invention is to provide a condenser of the type specified wherein the rotor plates are so coupled capacitively between the condenser terminals that there is practically no tendency toward the setting up of potential differences between the various rotor plates which otherwise would cause the capacity of the condenser to be affected by axial movements of the rotor.

A further object is to provide a condenser of the type specified which is mechanically strong and simple structurally.

A further object is to provide a condenser of the type specified which includes in a unitary device both fixed and variable capacity elements connected in parallel relation, wherein the plates of the stator element constitute such fixed capacity and further cooperate with the plates of the rotor element to constitute such variable capacity.

A feature of the invention consists in an arrangement whereby there is no condenser terminal associated with the rotor element thereby eliminating the necessity for sliding contacts, flexible connections or the like, such as are required for variable condensers, as commonly constructed.

In variable condensers of the rotary interleaving plate type, including those of the best construction, there exists at all times a certain amount of axial thrust or end-play of the rotor spindle which increases with use due to wear upon the bearing surfaces. This end-play of the rotor spindle produces corresponding axial movements between the rotor and stator plates. Such axial movements do not change the sum of the dielectric gap widths occurring between a pair of adjacent stator plates and a rotor plate interleaving the same since the spacing of the stator plates is fixed. Dielectric gaps, the sum of which is thus maintained constant, for all axial movements of the rotor element are termed "complementary".

Variable condensers of the rotary interleaving plate type are in general so constructed that complementary dielectric gaps occurring between rotor and stator plates are connected in parallel between the condenser terminals, due to the fact that the rotor plates are all connected to one such terminal and the stator plates to the other. With such an arrangement, the resultant capacity between the condenser terminals for a given angular setting of the rotor element, is affected by axial shiftings of the rotor element, since, as is well known, the resultant capacity is inversely proportional to the product of the complementary dielectric gaps, which product varies in accordance with the axial position of the rotor relative to the stator element. A precise calibration of such a condenser is, therefore, impossible due to the fact that axial shiftings of the rotor element which occur during or subsequent to a calibration thereof will introduce inaccuracies in the results obtained.

Condensers have been constructed in the past in which the above objectionable feature is overcome by providing a condenser assembly wherein the dielectric gaps constituting each complementary pair are connected in series with the various series pairs connected in parallel between the condenser terminals. In accordance with such an arrangement, as is well known, the resultant capacity for a given rotor setting is inversely proportional to the sum of the complementary gap widths, and since this sum is constant irrespective of axial shiftings of the rotor element, the resultant condenser capacity is likewise unaffected by this factor.

Such condensers as have been in the past constructed upon this latter principle, however, are open to the objection that axial movements of the rotor element results in the various rotor plates thereof being at different potentials, thus requiring that the successive rotor plates be insulated from one another, and even where this is done the capacities occurring between them affect in some degree the constancy of the condenser capacity in the presence of axial movements of the rotor. In order, therefore, to avoid this effect, it becomes necessary with such condensers to shield the rotor plates from each other thruout their entire angle of rotation. Furthermore, the fixed minimum capacity of such an arrangement is obtained by cooperation between the stator and rotor plates by having the stator plates extend thru the complete angle of rotation of the rotor plates, i. e., 360°. This is not the ideal arrangement and tends toward electrical and mechanical complications requiring excessive material and parts.

It is the purpose of the present invention to provide a precision condenser of the rotary interleaving plate type, having a fixed minimum capacity and a continuously variable capacity in parallel therewith, which is relatively simple in construction and is still free from inconstancy due to axial movements of the rotor relative to the stator element. With the condenser to be described, the various rotor plates are inherently at approximately the same potential at all times, thus eliminating capacity changes in the presence of axial movements of the rotor due to this factor. Furthermore, the rotor plates being at the same potential may be conductively connected by mounting them directly upon a metal spindle thereby providing a structure which is strong mechanically.

The fact that the condenser disclosed comprises a fixed capacity in parallel relation with a variable capacity renders such a condenser peculiarly adapted for use in frequency meter, i. e., wavemeter, service in radio transmitters and receivers using extremely high frequencies, of the order of 3,000 kilocycles per second or higher, altho, of course, its use is not restricted to such service. It becomes desirable in this high frequency range to vary the resonance frequency by minute increments, and this is facilitated by making the ratio of maximum to minimum capacity relatively small. A convenient way of accomplishing this result is to connect a fixed capacity in parallel with a variable capacity. The present invention accomplishes this result in a single unitary structure.

In order to explain in detail the manner in which the aforementioned desirable results are obtained, reference is had to drawings, of which—

Figs. 1 and 3 show in cross-section condenser assemblies in accordance with existing modes of construction which assemblies are necessary for pointing out certain novel features of the present invention.

Figs. 2 and 4 show in circuit diagram form the interplate capacities for the condenser assemblies of Figs. 1 and 3, respectively.

Figs. 5, 7, 9 and 10 show cross-sectional views of condenser assemblies embodying the novel features of the present invention.

Fig. 6 is a circuit diagram showing the interplate capacities for the structure of Fig. 5; while Fig. 8 shows a corresponding circuit diagram applicable to the structures of Figs. 7, 9 and 10.

Figure 11:
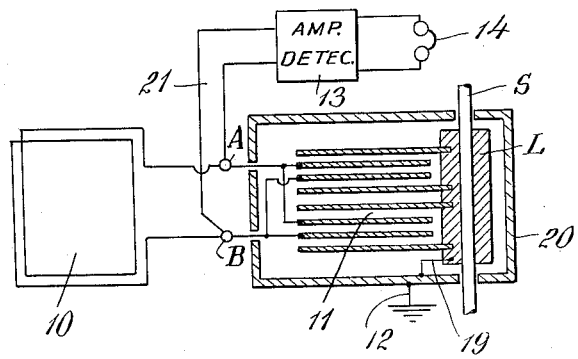
Figure 12:
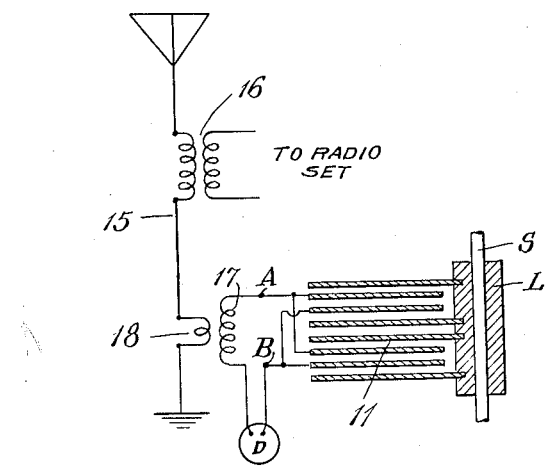

Figs. 11 and 12 disclose certain specific applications to radio systems of the novel condensers disclosed herein. Fig. 11 shows a method of associating such a condenser with a loop antennna circuit; while Fig. 12 shows the manner of utilizing a novel condenser as disclosed herein in the circuit of a frequency meter.

In all of the assemblies shown, the condenser plates may be of any desired shape in accordance with the adapatation of the condenser to a particular purpose. For example, the plates may be so shaped that the law connecting capacity with angular displacement of the motor will be linear, inverse linear, square, exponential, or in accordance with any other desired mathematical relation.

Referring now to Fig. 1, an elementary condenser assembly is shown comprising fixed plates 1 and 3 connected, respectively, to terminals A and B, and interleaved therewith a movable plate 2 rigidly affixed to spindle S by means of boss L surrounding the same. It will be noted that the gap widths $x$ and $y$ between the fixed and movable plates are complementary, i. e., their sum is constant irrespective of the position of plate 2 relative to plates 1 and 3. Likewise, since the capacities $C_x$ and $C_y$, corresponding to dielectric gaps $x$ and $y$, are in series across terminals A and B, the resultant capacity between such terminals will be unaffected by axial shiftings of plate 2 relative to plates 1 and 3.

Fig. 2 shows in circuit-diagram form, the interplate capacities effectively connected between terminals A and B of Fig. 1 for a given rotor setting. $C_x$ and $C_y$, as mentioned, represent the capacities between the fixed and movable plates, while $C_f$ represents, for a given angular setting of the rotor, the capacity between the portions of the fixed plates 1 and 3 which are in direct electrostatic relation to each other.

The above statements regarding the capacity between terminals A—B may be proved quite simply in accordance with the following mathematical relations. Since gaps $x$ and $y$ are connected in series between terminals A—B, the following relation is true, neglecting for the moment capacity $C_f$ which is, of course, unaffected by the inaccuracies mentioned:

$$(1) \quad \frac{1}{C_t} = \frac{1}{C_x} + \frac{1}{C_y},$$

or $$(2) \quad C_t = \frac{1}{\frac{1}{C_x} + \frac{1}{C_y}},$$

where $C_t$ is the resultant capacity between terminals A—B, and $C_x$ and $C_y$ are the capacities due to dielectric gaps $x$ and $y$, respectively. For a given rotor setting the capacities $C_x$ or $C_y$ are directly proportional to the exposed area between the fixed and movable plates and inversely proportional to the respective gap widths. Since the exposed area is the same for capacities $C_x$ and $C_y$, Equation (2) may be written as $$(3) \quad C_t = \frac{K}{x+y},$$

where K is the proportionality factor relating capacity with exposed plate area for a given rotor setting. Referring now to Fig. 1, suppose that the plate 2 is shifted downward toward plate 3 by an amount $d$. This will result in increasing $x$ and decreasing $y$ by this amount. Thus inserting the above relations in Equation (3) gives $$(4) \quad C_t = \frac{K}{(x+d)+(y-d)} = \frac{K}{x+y},$$

or the same result as for Equation (3). Thus Equation (4) clearly brings out the fact that for a given rotor setting the resultant capacity between terminals A—B of Fig. 1 is unaffected by axial shiftings of the rotor element.

Compare, now, the results obtained with the condenser assembly of Fig. 1 with corresponding results for condensers of the rotary interleaving place type in general use. The usual condenser of this type would be assembled as shown in Fig. 1 with the exception that the fixed plates 1 and 3 would be connected to one condenser terminal while the movable plate 2 would be connected to the other condenser terminal. Thus the interplate capacities would be connected in parallel between the condenser terminals in which case the total capacity therebetween will be $$(5) \quad C_t = C_x + C_y;$$

or replacing $C_x$ and $C_y$ by their equivalents $$(6) \quad C_t = \frac{K}{x} + \frac{K}{y} = \frac{K \cdot (x+y)}{xy}.$$

Assuming, now, that plate 2 is shifted toward plate 3 by an amount $d$, Equation (6) becomes $$(7) \quad C_t = K \frac{(x+d)+(y-d)}{(x+d) \cdot (y-d)} = K \cdot \frac{(x+y)}{(x+d)(y-d)}.$$

Comparing Equations (6) and (7) it will be seen that the resultant capacity $C_t$ is not the same for the two conditions. This means, of course, that for the usual type of variable condenser wherein the interplate capacities are in parallel between the condenser terminals, the resultant capacity between terminals is affected by axial shiftings of the rotor element.

The difference in the two types of condensers compared can be seen from Equations (4) and (6). With the dielectric gaps connected in series the resultant capacity is dependent only on the sum of the gap widths, namely $x+y$, which sum is a constant; whereas with the gaps connected in parallel the resultant capacity is also dependent upon the product of the gap widths, namely $x \cdot y$, which product varies in accordance with the above-mentioned factors.

Fig. 3 shows an assembly similar to Fig. 1, but utilizing a plurality of sets of fixed and movable plates. Two movable plates 2 and 4 are shown, interleaved between the fixed plates 1, 3 and 5. The movable plates are in fixed relation to each other, being held in rigid assembly with spindle S by means of boss L. The dielectric gaps between plates 1 and 2, 2 and 3 are complementary as are the gaps between plates 3 and 4, 4 and 5; hence, the resultant capacity of $C_x$ and $C_y$ in series is constant, as is likewise that of $C_x'$ and $C_y'$, irrespective of the position of the rotor plates relative to the stator plates at any given angular setting. In order to connect each pair of complementary capacities in series between terminals A and B, it is necessary to connect the fixed plates alternately to terminals A and B as shown. Thus in passing from terminal A to B thru plates 1, 2 and 3, capacities $C_x$ and $C_y$ are connected in series in the order named. Likewise, in passing from A to B thru plates 5, 4 and 3, respectively, $C_y'$ and $C_x'$ are in series in the order named.

Fig. 4 shows in circuit-diagram form the various interplate capacities between terminals A and B. $C_f$ is the total capacity of the portions of the fixed plates which are in direct electrostatic relation to each other for a given rotor setting. The component capacities $C_x$, $C_y$, $C_x'$ and $C_y'$ have been mentioned. A certain impedance Z will exist between the movable plates 2 and 4, depending principal upon the material of which boss L is constructed and the manner of connecting the plates thereto. Assuming for the moment that boss L is of a highly insulating material, the impedance Z will be practically infinite and hence may be neglected. Under such conditions, the capacity between terminals A and B will be independent of axial movements of the rotor elements or the other inaccuracies mentioned, since for a given angular setting the resultant capacity of $C_x$ and $C_y$ in series is constant; likewise, that of $C_x'$ and $C_y'$ is constant; and since these two resultant constant capacities are in parallel, their sum is likewise constant.

If, however, the impedance of Z is low, the above relations no longer hold true, as will now be pointed out. It will be noted that the capacities $C_x$, $C_y$, $C_x'$ and $C_y'$ are so connected as to constitute the balancing arms of a bridge network in which terminals A—B constitute one pair of conjugate points, while plates 2 and 4 constitute the other pair, with impedance Z connected therebetween. Now, in general, the condenser of Fig. 3 would be constructed to have equal distances between successive stator plates, and likewise between successive rotor plates in which case $C_x = C_x'$ and $C_y = C_y'$, substantially.

Even where this precaution is taken, the bridge comprising elements $C_x$, $C_y$, $C_x'$ and $C_y'$ would not be balanced, assuming the rotor plates to be in any position other than midway between the adjacent stator plates. This condition exists as a result of the unsymmetrical manner in which the component capacities are connected between terminals A and B; that is to say, $C_x$ is connected to terminal A, while its equal $C_x'$ is connected to terminal B and likewise $C_y'$ is connected to A and its equal $C_y$ to B. Assuming, as mentioned, that $C_x$ is different from $C_y$, then for a voltage impressed between terminals A—B, in accordance with the well-established principles of such a bridge network, plate 2 will be at a different potential from plate 4, which potential difference will set up a current thru impedance Z. This unbalance current will cause a redistribution of the potential drops across the various complementary capacities $C_x$ and $C_y$, and $C_x'$ and $C_y'$ from whence it becomes obvious that the capacity between terminals A—B will no longer be independent of axial movements of the rotor.

It thus becomes necessary, in order to effect constant capacity relations by means of an assembly such as is shown in Fig. 3, to have the rotor plates highly insulated from each other in order to maintain a high impedance Z therebetween. Such a condition is in practice difficult to obtain, since any moisture or dust collecting on the surface of boss L will cause considerable leakage between plates. Furthermore, if the movable plates are close together, there will be appreciable capacity effects between the same, even when the most suitable insulating materials are used. These capacity effects will be increased as the area decreases by which fixed plate 3, for instance, interleaves plates 2 and 4. Furthermore, such a structure will be weak mechanically since most insulating materials are inherently weak as compared to conductors.

The structural arrangements of the present invention which are now to be discussed provide condenser assemblies accomplishing the objects of the invention mentioned above, while at the same time eliminating the objectionable features inherent in the assembly of Fig. 3.

An elementary condenser structure in accordance with this invention is shown in Fig. 5. It comprises fixed plates 2 and 3 adjacent each other and connected, respectively, to terminals A and B, and movable plates 1 and 4 in fixed relation to each other mounted rigidly on the rotatable spindle S by means of boss L which is of conductive material. The two stator plates are interposed between the two rotor plates, so that the capacity between terminals A and B comprises the fixed capacity $C_k$ existing only between the stator plates, having in shunt therewith the series circuit comprising the variable capacities $C_x$ and $C_y$ between the upper and lower stator and rotor plates, respectively, as is shown more clearly in the circuit diagram of Fig. 6. The gaps $x$ and $y$ being necessarily complementary, the resultant capacity of $C_x$ and $C_y$ in series is constant irrespective of axial movements of the rotor element.

Fig. 7 shows an assembly comprising a plurality of capacity groups each similar to the single group shown in Fig. 5. In Fig. 7 stator plates 2 and 3 are interposed between rotor plates 1 and 4; and similarly, stator plates 6 and 7 are interposed between rotor plates 5 and 8. The rotor plates are all rigidly affixed to spindle S by means of bosses H, I and J rigidly mounted on spindle S. The spacing between plates 1 and 4 is preferably the same as that between plates 5 and 8. Likewise, the spacing between plates 2 and 3 is preferably the same as that between plates 6 and 7. Also, the spacing between corresponding stator and rotor plates is the same so that gaps $x$ and $x'$ are equal, as are gaps $y$ and $y'$. Of course, gaps $x$ and $y$ are complementary, as are gaps $x'$ and $y'$. The fixed plates are connected alternately to terminals A and B, as shown. Variable plates 1 and 4 are conductively connected by means of boss H of conductive material; and likewise, plates 5 and 8 are conductively connected by means of boss J of conductive material. The spindle S for the moment will be assumed to be of insulating material.

Fig. 8 shows in circuit-diagram form the manner in which the inter-plate capacities of Fig. 7 are connected between terminals A and B. The capacity $C_k$ is the fixed capacity existing only between adjacent stator plates. The capacities $C_x$ and $C_y$ corresponding to the complementary gaps $x$ and $y$ are serially connected between A and B, as are the capacities $C_x'$ and $C_y'$ corresponding to gaps $x'$ and $y'$ and are in shunt to $C_k$. It will be noted that as before the elements $C_x$, $C_y$, $C_x'$ and $C_y'$ constitute the balancing arms of a bridge network, wherein the terminals A and B may be considered to constitute one pair of conjugate points, while the conductive bosses H and J constitute the other pair of conjugate points. Between the conductors H and J is connected an impedance Z to represent the impedance of boss I separating bosses H and J. This impedance, of course, is dependent principally upon the material of which boss I is constructed, which, for the moment, will remain unspecified.

Now, continuing the assumption that the gaps are substantially equal, as stated above, i. e., $C_x=C_x'$ and $C_y=C_y'$, then owing to the symmetrical manner in which the capacity elements are connected between terminals A and B, the bridge will be balanced; for, in this instance, it will be noted that equal capacities $C_x$ and $C_x'$ are connected to terminal B, and equal capacities $C_y$ and $C_y'$ are connected to terminal B. Hence, in accordance with the well-known principles of such a bridge network, for a voltage impressed between terminals A and B there will be no difference of potential between points H and J. Thus the impedance of Z has no effect on the network. It may, with equal indifference, amount to an open circuit or a short circuit. Assuming for a moment that Z amounts to an open circuit, it is at once obvious that the resultant capacity between terminals A and B is independent of axial movements of the rotor element of Fig. 7, since the complementary capacities $C_x$ and $C_y$ are in series between A and B, as are likewise the complementary capacities $C_x'$ and $C_y'$. Owing to the bridge balance, the same result will be obtained if Z amounts to a short circuit.

Figure 9:
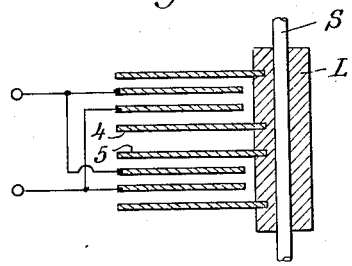

Referring now to Fig. 7, the impedance Z may be reduced to a short circuit by making boss I of a theoretically perfect conductive material, or more simply in practice by combining bosses H, I and J into a single conductive boss L, as shown in Fig. 9. Likewise, in Fig. 9 the spindle S is of conductive material so that a mechanically strong structure is obtained.

It will thus be seen that the assembly of Fig. 9 provides a condenser structure, of which the effective capacity is variable between certain limits, but which is unaffected by axial shiftings of the rotor plates and which structure at the same time overcomes the drawbacks of the assembly depicted in Fig. 3. As pointed out above, it will be noted that with the condensers shown there is no terminal associated with the rotor elements, thus eliminating the necessity for sliding contacts or flexible connections.

Figure 10:
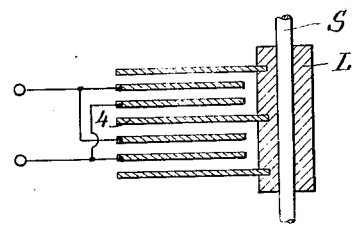

The assembly of Fig. 10 may be obtained from that of Fig. 9 by combining plates 4 and 5 of Fig. 9 into the single plate 4 of Fig. 10. This combination does not change the operating characteristics of the condenser since in Fig. 9 plates 4 and 5 are conductively connected.

The condensers of Figs. 9 and 10 show only four stator plates together with the necessary rotor plates. It is to be understood that any larger number of stator and rotor plates may be added, following the scheme of connections indicated in the figures.

Fig. 11 shows an application of a condenser of the type disclosed in Fig. 9 to a radio receiving circuit utilizing a loop antenna. Referring to Fig. 11, the variable condenser is indicated by numeral 11, the terminals A—B of which are connected across the loop antenna 10. The input 21 to the amplifier detector 13 of the radio receiving unit is bridged across terminals A—B. In the drawing, a headset 14 is shown associated with the output of the unit 13. The condenser 11 is shielded from external capacity effects by means of the metallic shield 20 completely enclosing the same. The rotor element is grounded to the shield by means of conductor 19 and the shield in turn is grounded at 12. With this arrangement, the condenser is protected from variations in the capacity of the external field surrounding the same such as would occur, for instance, during manipulation of the spindle S by the operator.

Fig. 12 shows the application of a variable condenser of the type disclosed in Fig. 9 to a frequency meter. The frequency meter comprises a fixed inductance 17 connected in series with the variable condenser 11 and a suitable detector unit D which, for example, could be a hot-wire ammeter. The frequency meter is associated with the antenna circuit 15 of a radio system by means of a coil 18 comprising a few turns serially connected in the antenna circuit. The coil 18 is coupled magnetically with the fixed inductance 17.

Thus, if it is desired to determine the frequency of a current flowing in the antenna circuit 15, the condenser 11 is adjusted until the detector unit D gives a maximum indication, the frequency then being determined from a previously attained calibration showing the relation between angular setting of the condenser 11 and the resonant frequency of the frequency meter. The condenser 11 in Fig. 12 may, of course, be shielded in the same manner as was shown for the condenser of Fig. 11 and for the same reasons.

I claim:

1. An electrical condenser comprising in a unitary structure a fixed condenser connected in parallel relation with a variable condenser, said variable condenser comprising a shunt connection of a plurality of pairs of serially connected complementary dielectric gaps.

2. An electrical condenser comprising in a unitary structure a fixed condenser in parallel connection with a variable condenser, said variable condenser comprising serially connected complementary dielectric gaps.

3. An electrical condenser comprising in a unitary structure in parallel connection between a pair of terminals, a fixed condenser and a plurality of variable condensers, with each said variable condenser consisting of a pair of serially connected complementary dielectric gaps the capacities of which are in a ratio between said terminals which is substantially the same for all said variable condensers, whereby points intermediate all complementary gaps will inherently assume substantially the same potential for voltages impressed between said terminals.

4. An electrical condenser comprising fixed and movable elements each consisting of a pair of conductive plates spaced apart in fixed relationship, the plates of said fixed element being joined respectively to a pair of terminals for connecting a fixed capacity therebetween, and said fixed element being interposed between the plates of said movable element, the latter being conductively joined for connecting between said terminals and in parallel with said fixed capacity, a variable capacity consisting of serially connected complementary dielectric gaps occurring between said fixed and movable elements.

5. An electrical condenser comprising fixed and movable elements each consisting of a plurality of conductive plates spaced apart in fixed relationship, with the plates of said fixed element interposed in pairs between conductively joined plates of said movable element, and with the plates of each said pair joined respectively to a pair of terminals for connecting in parallel relation therebetween a fixed capacity and a variable capacity comprising the serially connected complementary dielectric gaps occurring between said fixed and movable elements.

6. An electrical condenser comprising a pair of adjacent stator plates joined respectively to a pair of terminals and interposed between a corresponding pair of conductively connected rotor plates, whereby the complementary dielectric gaps occurring between said rotor and stator plates are serially connected between said terminals.

7. An electrical condenser comprising a pair of adjacent stator plates joined respectively to a pair of terminals and interposed between a corresponding pair of conductively connected rotor plates for providing in a unitary structure a fixed capacity connected in parallel relation with a variable capacity which latter is unaffected by axial movements of the rotor relative to the stator element.

8. An electrical condenser comprising rotor and stator elements each consisting of a plurality of conductive plates spaced apart in fixed parallel relationship, with the plates of said stator element interposed in pairs between conductively connected plates of said rotor element, and with the plates of each said pair joined respectively in corresponding sequence to a pair of terminals for connecting therebetween in parallel relationship, a fixed and a variable capacity which is unaffected by small axial movements of the rotor relative to the stator element.

9. An electrical condenser comprising rotor and stator elements each consisting of a plurality of conductive plates spaced apart in fixed parallel relation, said stator plates being conductively connected alternately to a first and a second terminal, said rotor and stator plates being so intercalated that adjacent stator plates in pairs are situated beween adjacent rotor plates, said adjacent rotor plates being conductively connected whereby complementary dielectric gaps between said rotor and stator plates are serially connected between said terminals.

10. An electrical condenser comprising rotor and stator elements each consisting of a plurality of conductive plates spaced apart in fixed parallel relation, said stator plates being conductively connected alternately to a first and a second terminal, said rotor plates being conductively connected in adjacent pairs, and said rotor and stator plates being so intercalated that successive pairs of stator plates are situated between successive pairs of connected rotor plates but out of contact therewith.

11. An electrical condenser comprising rotor and stator elements each consisting of a plurality of conductive plates spaced apart in fixed parallel relation, said stator plates being conductively connected alternately to a first and a second terminal, said rotor and stator plates being so intercalated that adjacent stator plates in pairs are situated between adjacent rotor plates, said adjacent rotor plates being conductively connected whereby complementary dielectric gaps between said rotor and stator plates are serially connected between said terminals, the spacing between said plates being such that the distance between corresponding stator plates of said pairs equals the distance between the rotor plates respectively adjacent thereto.

12. An electrical condenser comprising rotor and stator elements each consisting of a plurality of conductive plates spaced apart in fixed parallel relation, with said stator plates connected alternately to a first and a second terminal, with said rotor plates conductively connected to each other, with successive pairs of stator plates interposed between successive pairs of rotor plates but out of contact therewith, and with equal spacing between corresponding stator and rotor plates of said pairs.

13. An electrical condenser comprising rotor and stator elements each comprising a plurality of conductive plates spaced apart in fixed parallel relation, with adjacent plates of said stator elements in pairs connected respectively to a first and a second terminal, with each said pair of stator plates interposed between a pair of adjacent rotor plates but out of contact therewith, said adjacent rotor plates being conductively connected, and the distance between corresponding stator plates of said pairs being equal to the distance between the rotor plates respectively adjacent thereto.

WILLIAM H. HOFFMAN.